March 14, 1972 G. CONTRONI ET AL 3,649,460
ISOLATION OF HEMOPHILUS BACTERIA
Filed March 7, 1969

GUIDO CONTRONI  INVENTORS
WAHEED N. KHAN
JAMES R. PATRICK
SYDNEY ROSS

BY *Semmes and Semmes*
ATTORNEYS

United States Patent Office 3,649,460
Patented Mar. 14, 1972

3,649,460
ISOLATION OF HEMOPHILUS BACTERIA
Guido Controni, New Carrollton, Waheed N. Khan, Silver Spring, and James R. Patrick, Mount Airy, Md., and Sydney Ross, Washington, D.C., assignors to Children's Hospital of the District of Columbia, Washington, D.C.
Continuation-in-part of application Ser. No. 703,480, Feb. 6, 1968, now Patent No. 3,445,339. This application Mar. 7, 1969, Ser. No. 805,330
The portion of the term of the patent subsequent to May 20, 1986, has been disclaimed
Int. Cl. C12k 1/04
U.S. Cl. 195—100
7 Claims

ABSTRACT OF THE DISCLOSURE

A method of isolating and discerning the presence of Hemophilus species in cerebral spinal fluid and body cavity fluid specimens, which is equally adapted to isolation and examination of these bacteria: meningococci; staphylococci: pneumococci. A carrier disc, impregnated with saponin, Bacitracin and optionally yeast extract, is provided for use with a blood agar plate streaked with the suspect microroganisims. One principal application of the method lies in the ready identification of pathogenic *Hemophilus influenzae*, which are virtually always capsulated and nearly all belong to Type *b*.

This is a continuation-in-part of copending patent application Ser. No. 703,480, now Pat. No. 3,445,339, filed Feb. 6, 1968, entitled Isolation of Hemophilus Bacteria.

DESCRIPTION OF THE PRIOR ART

In the past, the most widely used medium in clinical laboratories for the isolation of *Hemophilus influenzae* is chocolate agar generally containing hemin and Supplement B. Disadvantages for the recovery of *H. influenzae* are that chocolate agar, being a very rich medium, supports the growth of other organisms which often overgrow the more fastidious *H. influenzae;* many of these organisms resemble *H. influenzae* due to opacity of the chocolate agar. As is known, the pathogenic *H. influenzae* colonies are generally recognized by an iridescence, rendered difficult to observe by the opaqueness of the medium chocolate agar. Since iridescence is perhaps the most characteristic property which helps differentiate *H. influenzae* from *H. parainfluenzae*, it is for this reason that a new process which would not only further enhance the growth of *H. influenzae*, but also permit a distinction between the perspective hemophilic organisms becomes important.

Additionally, Supplement B may be denatured by heat during preparation of the medium, said denaturation being difficult to detect without strict quality control of the media. In the past, the Levinthal and Fildes media have been considered as effective for the growth of *H. influenzae*, both said media being transparent and suitable therefore for the study of iridescence of hemophilus species, but lack of erythrocytes in Levinthal and Fildes media make them inadequate for such pathogens which are identified by their hemolysis. Because both such media must be freshly made and because they are difficult to prepare in a clinical laboratory, it is impractical to maintain a fresh supply thereof. Accordingly, the present method is adapted to isolating especially the selected bacteria for a more practical and faster diagnosis of the organism in meningitides and bacteremias.

BRIEF DESCRIPTION OF THE DRAWINGS

The drawings represent in schematic the process of isolation, hereinafter described and claimed.

DESCRIPTION OF THE PREFERRED EMBODIMENTS

In this invention, the following steps are taken to accomplish the desired result of isolating, for example, the bacteria *H. influenzae*.

Step I

A petri dish is prepared with a sheep blood agar medium. The blood agar base media is prepared by introducing approximately 40 grams of a blood agar base into a liter of distilled water, heated until dissolved and sterilized at 118 to 120° C. under 15 lbs. pressure for 15 minutes. When the medium has cooled to 45 to 50° C., 5 to 10% sterile defibrinated sheep blood is added, and the same applied in 20 ml. quantities to a Petri dish for solidification.

Step II

The second step involves inoculation and streaking of the blood agar medium with a cerebral spinal fluid or body cavity fluid specimen, the details of streaking being described hereinafter.

Step III

Under the third step, a saponin-yeast or saponin-yeast antibiotic-bactracin disc of low concentration is prepared from a sterile filter paper assay disc, the preferred solution being a 5% saponin solution to which may be added a 5% yeast extract preferably rich in DPN as a source of enzyme growth, although the process may be attained without DPN and/or without yeast. The purpose of the saponin is to hemolyze erythrocytes, forming a clear zone of hemolysis around the disc when applied to the sheep blood agar medium, prepared as above. The initial application of the disc is to break cells and release hemin as an X factor and DPN as a V factor; the effect herein is not only to create a clear zone of hemolysis around the disc, but also by the action of saponin to release DPN from erythrocytes making it available to *H. influenzae* to enhance growth of colonies thereof.

Step IV

Fourthly, there is an incubation of the inoculated plate resulting in growth and isolation of the pathogenic bacteria, incubation being at 37° C. for a period of 8 to 12 hours under the influence of carbon dioxide, preferably for a period of 18 to 24 hours.

Figure 1:
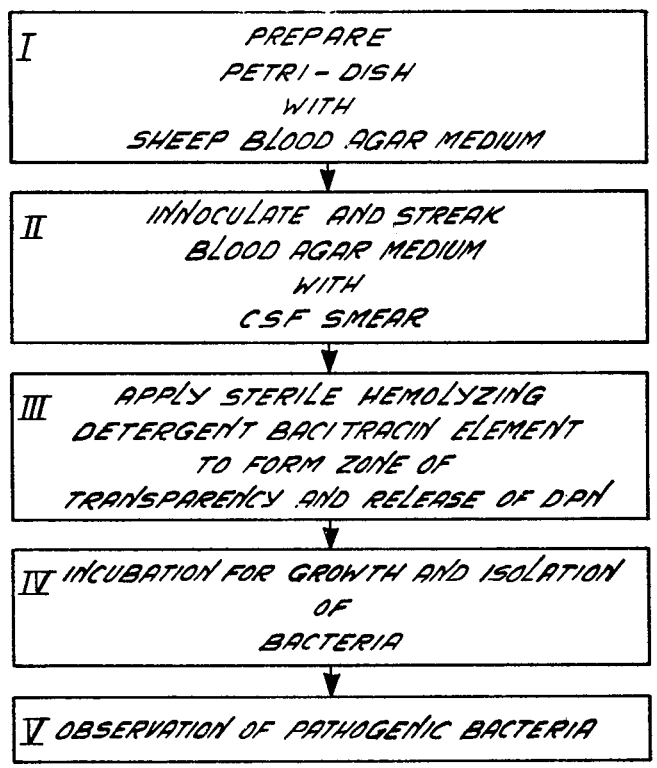
FIG. 1 is a flow sheet of the process.
Figure 2:
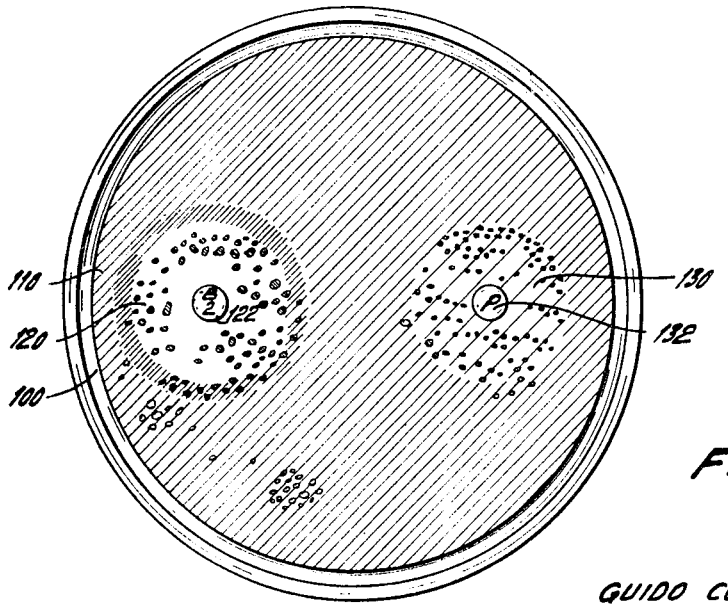
FIG. 2 represents in schematic the effect created thereby.

With reference to FIG. 2 of the drawings, there is illustrated in fragment a portion of a Petri dish 100 having the sheep blood agar medium 110 within. For practical purposes, the medium is approximately 3 mm. deep. Although not shown, an inoculated zone of the sheep blood agar medium exists in a horizontal zone immediately above and below and through the treated zones 120 and 130. This zone of inoculation would include the following: *H. influenzae; Diplococcus pneumoniae* and the alpha streptococci. The zone has been inoculated in accordance with the procedure set forth hereinafter.

The present blood agar plate shows not only a zone of transparency 120 wherein stromatolysis and/or hemolysis releases DPN from the erythrocytes, but also a zone of inhibition 130 for the D. pneumoniae. The particular disc 132 within is saturated with optochin. In this zone of inhibition 130, one is able to differentiate between the D. pneumoniae and alpha streptococci; whereas in the zone 120, both zones being within the same Petri dish and within the same blood agar medium, the zone of transparency 120 is created by the hemolytic action of the saponin disc 122, permits the observation of the bacteria H. influenzae. Noteworthy is the fact that the zone 130 is opaque wherein the zone 120 is essentially transparent permitting thereby the unique distinctive observations claimed herein.

As claimed hereinafter, the zone of hemolysis 120 is created by the saponin emanating from the disc, whereas bacitracin thereof inhibits the growth of other foreign bacteria or other gram positive bacteria. This then creates an area 120 which is purely selective for observation of the H. influenzae. The characteristic iridescence of the H. influenzae bacteria is thus totally accurately observed in the transparent zone, and the other areas of the same medium may be used for totally unrelated observations and discoveries.

EXPERIMENT

A successful experiment herein resulted in the following:

Sterile saponin solution was prepared by adding 3.0 grams of saponin to 100 cc. of .85% NaCl that is of a strength which is non-hemolyzing. The saponin was dissolved by mild agitation without formation of bubbles and 5.0 grams of yeast extract were added. When the yeast extract had dissolved completely, the solution was filtered through a 0.20 micron plain membrane Nalgene filter. Sterile Bacitracin (2.0 units) paper discs, one-quarter inch in diameter, were saturated with the prepared saponin solution for our closed cavity fluid study. The saturated discs were then dried at 37° C. for 3 to 4 hours and stored at 4° C. prior to use. Chocolate, sheep blood and Fildes agar plates concurrently used in this study were made according to procedures described in Diagnostic Bacteriology by W. R. Bailey and E. G. Scott, 1966 edition, The C. V. Mosby Co., St. Louis, Mo.

Thirty clinical specimens were studied. The criteria to select a patient was an initial positive CSF smear demonstrating Gram-negative or Gram-positive organisms. The spinal fluid was then streaked on a sheep blood agar plate and a saponin-yeast extract disc placed over the inoculum. In addition to the blood plate, two chocolate plates were streaked, one for regular culture and the other for direct sensitivities. The time lapse between obtaining the spinal fluid and plating was no longer than one hour and the specimens were refrigerated while waiting to be plated. Blood cultures were incubated as they were obtained and subcultured every 12–18 hours. All the inoculated plates were incubated at 37° C. in a 10% $CO_2$ environment.

Seventy-five strains of Hemophilus species previously isolated from nasopharyngeal cultures and resistant to 2.0 units of Bacitracin were tested with 3% saponin soaked discs to check any inhibitory effect of saponin. Also, all the strains of H. influenzae isolated from blood and CSF were tested similarly to determine saponin and bacitracin susceptibility. Preliminary studies using the saponin-yeast-extract solution with low concentration Bacitracin discs for the recovery of H. influenzae from nasopharyngeal cultures have also been successful.

The streaking method was as follows: Two drops of either CSF or blood were placed into the media near the edge of a Petri plate and allowed to be absorbed. The plates were streaked continuously by free horizontal strokes of the inoculating needle from edge to edge of the plate. The inoculating needle was jabbed into the medium ⅓, ½ and ¾ of the way at one side of the plate until reaching the lower edge of the plate.

The results obtained with our technique on blood and CSF are shown in Table I. Thirty isolations of H. influenzae, Type B, were made and compared with growth on chocolate agar medium.

TABLE I

[Comparison of efficacy in isolations of H. influenzae on blood agar with saponin antibiotic disc and chocolate agar]

| H. influenzae Type B | Growth on blood agar with "SV" disc | | | Growth on chocolate agar | | |
|---|---|---|---|---|---|---|
| | Abundant | Scant | No growth | Abundant | Scant | No growth |
| Isolations | 30 | 0 | 0 | 24 | 3 | 3 |
| Percent | 100 | 0 | 0 | 80 | 10 | 10 |

Recovery of H. influenzae Type B on sheep blood agar using SV discs was 100%. Growth around the disc was heavy with numerous individual colonies or confluent where no distinction of colonies could be made. The individual colonies varied from 1 to 2 mm. in diameter and were raised, transparent and mucoid. The confluent growth was equally raised, mucoid and transparent but limited to the zone of saponin stromatolysis (FIG. 2). The growth in both cases had the distinct "mousy" odor which is so characteristic of H. influenzae and although organism recovery was limited to the zone of saponin stromatolysis, a quantitative comparison of the number of colonies per unit area was comparable to a similar zone in a well prepared chocolate agar plate. By comparison, growth on chocolate agar under the same conditions was irregular and recovery was 90%. Three chocolate plates failed to grow H. influenzae and three had only scant growth.

Observation of iridescence was made on all the isolations made on blood agar with impregnated discs. All the strains isolated were smooth and thereby classified as typical. Iridescence is perhaps the most characteristic property which helps differentiate H. influenzae from H. parainfluenzae. (Variation and Type Specificity in Bacterial Species Hemophilus influenzae. Pittman, M. J. Exp. Med., 53:471–492, 1931.) This observation of iridescence could not be made with chocolate plates.

Saponin discs did not have any inhibitory effect on the hemophilus strains isolated from the nasopharyngeal cultures.

Whereas this process had been described in terms of H. influenzae isolation, it is practically adaptable to isolation and identity of numerous other bacteria. Accordingly and without especial modification, the invention is limited solely as claimed.

"Hemolyzing agents," not inhibitory to Hemophilus herein shall be construed to include detergents such as:

(A) Saponins [1] of the natural plant source; and
(B) Chemical detergents such as, for example only:
(1) Saponin [1]
(2) Micro (Made by International Products Corp., P.O. Box 118, Trenton, N.J.)—active ingredient of this product is sodium ethylenediaminetetraacetate $$(Na_2C_{10}H_{14}O_8N_2 \cdot 2H_2O)$$

(3) Sklar Kleen (J. Sklar Mfg. Co., Inc., Long Island City, N.Y.)
(4) Haemo-Sol (Aloe Medical Co., St. Louis, Mo.)
(5) Tweens—trademark for a series of surface active agents consisting of partial esters of long-chain fatty acids with polyoxyalkylene derivatives of hexitol anhydride ---
[1] Saponin contains a sapogenon which may be a steroid or a tri-terpene and a sugar moiety: glucose, galactose, pentose or a methyl pentose.

We claim:

1. A solid carrier for isolating microbes depending upon X and/or V factors of the genus Hemophilus comprising:

(A) bacitracin; and (B) sapon, both said bacitracin and said saponin impregnating the carrier.

2. A solid carrier for isolating microbes depending upon X and/or V factors of the genus Hemophilus comprising:
   (A) bacitracin; and
   (B) saponin-yeast extract, both said bacitracin and said saponin-yeast extract impregnating the carrier.

3. The carrier according to claim 2 wherein the yeast extract is rich in DPN.

4. A composition of matter useful in isolating pathogenic bacteria and growing colonies thereof on an inoculated sheep blood agar substrate including:
   a saponin and bacitracin impregnated carrier which is in the form of a solid paper disc.

5. The composition of matter according to claim 4 in which the saponin contains salt in quantity that is non hemolyzing.

6. The composition of matter of claim 4 in which the paper disc is a sterile bacitracin disc.

7. The composition of matter of claim 6 in which the yeast extract is rich in DPN.

References Cited

UNITED STATES PATENTS 3,445,339   5/1969   Controni et al.   195—103.5

OTHER REFERENCES

Chemical Abstracts 50: 7395c.

A. LOUIS MONACELL, Primary Examiner

M. D. HENSLEY, Assistant Examiner

U.S. Cl. X.R.

195—103.5 R